(12) United States Patent
Chenevier

(10) Patent No.: US 9,206,040 B2
(45) Date of Patent: Dec. 8, 2015

(54) METHOD AND KIT FOR SEPARATING METAL AND SEMICONDUCTOR CARBON NANOTUBES

(75) Inventor: Pascale Chenevier, Villebon sur Yvette (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 819 days.

(21) Appl. No.: 13/147,140

(22) PCT Filed: Feb. 8, 2010

(86) PCT No.: PCT/EP2010/051510
§ 371 (c)(1),
(2), (4) Date: Jan. 30, 2012

(87) PCT Pub. No.: WO2010/089395
PCT Pub. Date: Aug. 12, 2010

(65) Prior Publication Data
US 2012/0114549 A1    May 10, 2012

(30) Foreign Application Priority Data
Feb. 6, 2009  (FR) .................................. 09 50757

(51) Int. Cl.
*C01B 31/02*   (2006.01)
*C09K 3/00*    (2006.01)
(Continued)

(52) U.S. Cl.
CPC ................. *B82Y 30/00* (2013.01); *B82Y 40/00* (2013.01); *C01B 31/0266* (2013.01); *C01B 2202/02* (2013.01); *C01B 2202/22* (2013.01); *C01B 2202/34* (2013.01); *C01B 2202/36* (2013.01)

(58) Field of Classification Search
CPC .... B82Y 30/00; B82Y 40/00; C01B 31/0266; C01B 2202/36; C01B 2202/22; C01B 2202/34; C01B 2202/02
USPC ........ 423/447.1–447.3, 445 B; 977/742–754, 977/842–848
See application file for complete search history.

(56) References Cited

U.S. PATENT DOCUMENTS

2004/0028599 A1* 2/2004 Pierard et al. ............. 423/447.1
2004/0040834 A1  3/2004 Smalley et al.
(Continued)

FOREIGN PATENT DOCUMENTS

JP    2007-031238 A    2/2007
WO    02/060812 A     8/2002
(Continued)

OTHER PUBLICATIONS

Arnold, et al., "Sorting carbon nanotubes by electronic structure using density differentiation." Nature Nanotechnology. 2006, 1:60-65.
(Continued)

*Primary Examiner* — Daniel C McCracken
(74) *Attorney, Agent, or Firm* — Knobbe, Martens, Olson & Bear, LLP (57) ABSTRACT

A method for separating metal carbon nanotubes with a single graphene layer (m-SWNT) and semiconductor nanotubes with a single graphene layer (sc-SWNT) is provided. The method may comprise a step for grafting, notably by radical chemical grafting, a diazonium salt derivative on a mixture of m-SWNTs and sc-SWNTs so as to obtain a mixture of grafted m-SWNTs, and non-grafted sc-SWNTs, whereby the grafted m-SWNTs and the non-grafted sc-SWNTs separate because of differential chemical and/or physical properties caused by said grafting. In addition, a kit for separating m-SWNTs and sc-SWNTs is provided.

18 Claims, 5 Drawing Sheets

(51) Int. Cl.
  *H01B 1/04* (2006.01)
  *B82Y 40/00* (2011.01)
  *B82Y 30/00* (2011.01)

(56) References Cited

U.S. PATENT DOCUMENTS

| | | | |
|---|---|---|---|
| 2004/0241077 A1* | 12/2004 | Ryzhkov | 423/445 R |
| 2005/0255031 A1 | 11/2005 | Jung et al. | |
| 2006/0204427 A1* | 9/2006 | Ghenciu et al. | 423/445 B |
| 2006/0223068 A1 | 10/2006 | Zhang et al. | |
| 2007/0258880 A1 | 11/2007 | Murakoshi | |
| 2008/0260616 A1* | 10/2008 | Tour et al. | 423/447.1 |

FOREIGN PATENT DOCUMENTS

| | | |
|---|---|---|
| WO | 03/006725 A1 | 1/2003 |
| WO | 03/084869 A2 | 10/2003 |
| WO | 2004/043857 A2 | 5/2004 |
| WO | 2004/048256 A2 | 6/2004 |
| WO | 2005/030640 A1 | 4/2005 |
| WO | 2005/041227 A2 | 5/2005 |
| WO | 2006/013788 A1 | 2/2006 |
| WO | 2006/096200 A | 9/2006 |

OTHER PUBLICATIONS

Barriare, et al., "Covalent modification of graphitic carbon substrates by non-electrochemical methods", Journal of Solid State Electrochemistry; Current Research and Development in Science and Technology, Mar. 14, 2008, pp. 1231-1244, vol. 12, No. 10, Springer, Berlin, Germany.

Belanger, et al. "Direct modification of a gold electrode with aminophenyl groups by electrochemical reduction of in situ generated aminophenyl monodiazonium cations." Chem. Mater. 2006, 18: 4755-4763.

Gomberg, et al., "The Synthesis of Biaryl Compounds by Means of the Diazo Reaction", Journal of the American Chemical Society, Oct. 1, 1924, pp. 2340-2343, vol. 46.

Heald, et al., "Chemical Derivatisation of Multiwalled Carbon Nanotubes Using Diazonium Salts", Chemical Physics and Physical Chemistry, Nov. 5, 2004, vol. 5, No. 11, pp. 1794-1799.

Marquardt, et al., "Reversible metal-insulator transitions in metallic single-walled carbon nanotubes." Nano Lett. 2008, 8:2767-2772.

Menard-Moyon, et al., "Separation of semiconducting from metallic carbon nanotubes by selective functionalization with azomethine ylides." Journal of the American Chemical Society. 2006, 128: 6552-6553.

International Search Report and Written Opinion for PCT/EP2010/051510 completed on Aug. 4, 2010 in 13 pages.

* cited by examiner

METHOD AND KIT FOR SEPARATING METAL AND SEMICONDUCTOR CARBON NANOTUBES

RELATED APPLICATIONS

This application is a U.S. National Phase of International Application No. PCT/EP2010/051510, filed Feb. 8, 2010, designating the U.S., and published in French as WO 2010/089395 on Aug. 12, 2011 which claims the benefit of French Patent Application No. 09 50757 filed Feb. 6, 2009.

TECHNICAL FIELD

The present invention belongs to the field of nanotechnologies and, notably to the field of nano-objects such as carbon nanotubes and, in particular SWNT carbon nanotubes.

The present invention aims at providing a method with which it is possible to separate selectively and specifically, metal SWNT carbon nanotubes and semiconductor SWNT carbon nanotubes. The method according to the invention is based on the reaction of the SWNT nanotubes with a diazonium salt derivative.

The present invention also proposes a kit for applying such a method.

BACKGROUND

Nanomaterials and notably carbon nanotubes are presently causing a particular fascination because of their original and exacerbated properties as compared with conventional materials. Carbon nanotubes notably form a novel promising material for organic electronics.

First of all, let us recall that a carbon nanotube is defined as a concentric winding of one or more graphene layers (carbon hexagonal nets). The term "Single Wall NanoTube" (SWNT) is used when a single layer of graphene is used and "Multi Wall NanoTube" (MWNT) is used in the case of several graphene layers. Due to their unique structure and their dimensions characterized by a high length/diameter ratio, nanotubes have exceptional mechanical, electrical and thermal properties.

In particular, depending on the concentric winding of the graphene layer making them up, SWNTs may either be metal, i.e. conductive with an electric resistance as low as 1 to 2 k$\Omega$ for a diameter of 1 to 2 nm, or semiconducting with an gap gradually increasing as the diameter decreases (typically from 0.5 to 1.2 eV). Significant scientific literature has demonstrated the benefit of SWNTs, because of their high conductivity and their metal or semiconductor nature, in electronic applications in field effect transistors, in high frequency devices, in variable resistors, as pixels, as a chemical detector in a liquid or gas phase, etc.

However, these studies emphasize on the difficulties due to the fact that metal SWNTs (m-SWNTs) and semiconductor SWNTs (sc-SMWTs) are generally synthesized simultaneously in a ratio close to 1:2 and this regardless of the applied synthesis method for the SWNTs. Even if a few examples are found showing that it is possible to synthesize specific nanotubes with good selectivity, the authors deplore the fact that the window of associated experimental parameters is very narrow (Marquardt et al. 2008 [1]). Thus, applications mainly using the high conductance of m-SWNTs are hindered by the low and unstable conductance of sc-SWNTs present in the mixture. Also, applications using the semi-conductor gap of sc-SWNTs are hampered by short circuits produced by the m-SWNTs. A certain number of studies were focused on the separation or the enrichment of SWNTs according to the diameter or the chirality in order to obtain samples enriched in m-SWNTs or in sc-SWNTs.

The first and the most efficient up to now of these methods is a differentiation method based on density. In this technique, the SWNTs are dissolved in water by using one or more surfactants. The surfactants surround the SWNTs, the surfactant-SWNT association being selective depending on their metal or semiconductor type. Surfactant-SWNT complexes have different densities and may be separated by ultracentrifugation on a density gradient (Arnold et al., 2006 [2]). As ultracentrifugations are carried out on limited volumes, the purified amounts are inevitably limited but samples may be obtained with a good degree of purity.

Similarly, the difference in the association with surfactants may be used for obtaining a difference in the overall charge of the SWNTs. International application WO 2003/084869 [3] describes a separation method based on different protonation of the SWNTs surrounded by surfactants, in solution, according to their chirality (n,m). At a given pH, a voltage is applied in order to attract the charged nanotubes towards the electrode and a fraction is collected. The method is repeated at different pHs allowing collection of fractions enriched with different chiralities (n,m).

Also, the DNA may be used as a polymeric surfactant for solubilization of SWNTs, and oligomers with different sequence and length have been used for separating SWNTs. The SWNT-DNA addition products may then be separated by iron exchange chromatography, the first fractions being enriched with metal SWNTs of small diameter and the last fractions in semiconductor SWNTs, of a large diameter. Patent application US 2006/0223068 [4] relates to SWNT-DNA hybrids and more particularly to the solubilization of SWNTs by surrounding them with DNA. DNA surrounds the SWNTs in order to form a rather unstable soluble hybrid. International application WO 2004/048256 [5] proposes a method for separating m-SWNTs and sc-SWNTs based on their solubilization by using short single strand DNA molecules. Once they are solubilized according to this method, the small diameter SWNTs may be separated by using standard chromatography, electrophoresis, iron exchange chromatography or two-phase systems.

Complexation may be used in a simpler way and this by solubilizing a portion of the SWNTs in a poor solvent. Indeed, SWNTs are insoluble in water and in most of the organic solvents. Ligands selected for their selectivity towards the chirality or the diameter of the SWNTs such as porphyrin, which is a specific ligand of sc-SWNTs may be used for surrounding them and solubilizing them. International application WO 2006/013788 [6] describes a method for separating m-SWNTs and sc-SWNTs based on their different solubility in amines.

The m-SWNTs and sc-SWNTs may also be separated according to their electromagnetic properties. The difference in the polarizability of m-SWNTs and of sc-SWNTs has already been utilized for separating them. Indeed, the dielectrophoretic attractive force applied by a high-frequency AC electric field on m-SWNTs is greater than that of sc-SWNTs. International application WO 2005/030640 [7] describes a separation method based on the difference in polarizability and based on optical trapping for the separation. The SWNTs are trapped by a focused laser beam and may be displaced in a microfluidic system from one channel to the other by displacing the laser beam. The SWNTs of different chiralities are trapped at different wavelengths of the laser, so that the SWNTs may be displaced according to their chirality.

Mention may further be made of methods for separating m-SWNTs and sc-SWNTs based on their capability of giving electrons, itself related to their conductivity or to their difference in magnetic moment.

Other separation methods are based on the different chemical reactivity of metal SWNTs vs. Semiconductors SWNTS or large SWNTs vs. small SWMTs.

A first selective and simple treatment is oxidation of m-SWNTs of small diameter under aggressive conditions. International application WO 2005/041227 [8] proposes a method based on the application of a voltage on SWNTs deposited on a substrate in order to protect a type of SWNT, the non-protected type either being burned or chemically destroyed, for example by treatment with a strong acid. Selective oxidation of SWNTs has also been described with electrophilic compounds such as nitronium $NO_2^+$ ions, the attack of which functionalizes the large diameter sc-SWNTs and destroys the m-SWNTs of small diameter. Patent application US 2005/0255031 [9] is based on selective oxidation with nitronium ions. Less aggressive oxidation conditions cause preferential functionalization of m-SWNTs.

On the other hand, powerful reducing agents such as alkaline metals preferentially affect small diameter m-SWNTs. Reduction of SWNTs may be followed by alkylation with a view to separation.

Further, the inorganic functionalization of SWNTs generally involving the reduction of a salt at the surface of the SWNTs was also used for separating SWNTs. Patent application US 2007/0258880 [10] describes a method for separating m-SWNTs and sc-SWNTs based on photochemical reduction of a metal salt at the surface of the SWNTs in solution. The photochemical reaction is selectively induced on a SWNT type by irradiation of the solution at their absorption wavelength. SWNTs coated with metal may be separated from the solution under the action of a magnetic field.

The formation of covalent bonds at the surface of SWNTs usually has some selectivity of m-SWNT vs. sc-SWNT. 1,3 dipolar addition on the double bonds of SWNTs was recently used for selective functionalization of sc-SWNTs and their selective solubilization (Article of Menard-Moyon et al, 2006 [11]). On the contrary, addition of diazonium is selective for m-SWNTs. Thus, patent application JP 2007 031238 [12] describes a method for separating sc-SWNTs from m-SWNTs by derivatization by using a diazonium salt which preferentially derivatizes m-SWNTs. Metal nanoparticles are then coupled with aryl entities and the nanoparticles are removed. The solution of the remaining non-coupled SWNTs is enriched in sc-SWNTs and used for making thin film transistors.

Further, international application WO 2004/043857 [13] proposes a method for separating m-SWNTs and sc-SWNTs using a terminal bond to a polymer. The polymer promotes solubility in solution and the bond between the polymers and the SWNTs may be selectively broken by a heat treatment repeated at increasing temperatures. The SWNTs without a bound polymer are separated by filtration.

It should be emphasized that the separation of SWNTs according to their metal or semiconductor type seems to be easier to control than for small diameter SWNTs, i.e. for diameters of less than 1 nm (CoMoCat or HiPco SWNTs). Indeed, small diameter SWNTs show generally greater chemical reactivity, due to the strong curvature of the wound graphene sheet which induces a voltage on the C—C bonds. These samples also contain a more restricted number of different chiralities, giving the possibility of purifying a single chirality. Unfortunately, electronic devices are difficult to obtain from small diameter SWNTs. Further, devices based on sc-SWNTs can only be made at a large scale if the fraction based on sc-SWNTs are of sufficiently high purity in order to avoid short circuits of the m-SWNTs.

In the case of the present methods with partial separation, the separation step has to be repeated several times in order to attain a high level of purity, which considerably increases the purification cost. Therefore, novel improved and cost-effective separation methods are still required.

DESCRIPTION OF CERTAIN INVENTIVE ASPECTS

The object of the present invention is to propose a functional method which inter alia meets the needs indicated above and which solves the technical problems of the methods of the prior art. The object of the present invention therefore relates to a method with which semiconductor SWNTs and metal SWNTs may be selectively and specifically separated and this regardless of their size.

Indeed, the work of the Applicant has allowed a method to be identified with which selective and specific separation of semiconductor SWNTs and metal SWNTs may be achieved.

The reaction of aryl diazonium ($N_2^+$—$C_6H_4$—R) on SWNTs, already described in patent application JP2007 031238 [12] allows selective functionalization of metal SWNTs.

Figure 1:
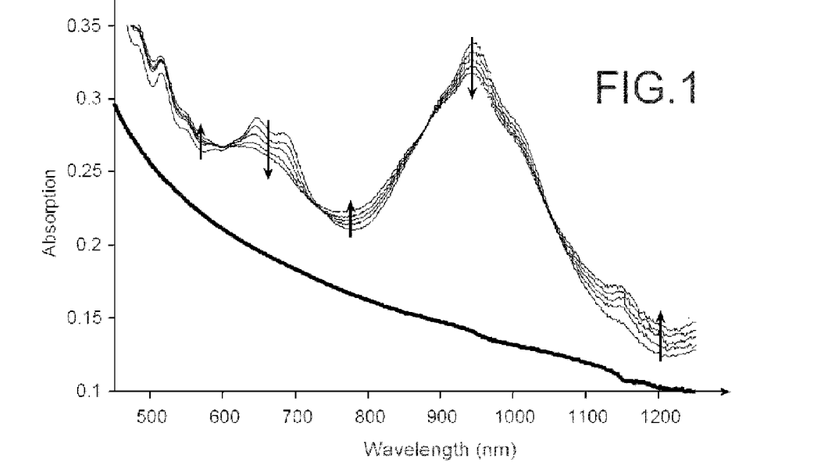
FIG. 1 shows the time-dependent change of the reaction of the SWNTs (Nanoledge, 18 mg/L) with BrBDT in a 2% F127 aqueous solution at 27° C. Thin lines: Spectra recorded at 15 s, 7 min, 14 min, 21 min and 28 min after mixing. Thick line: Baseline of the complete solution.

However, the reaction of aryl diazoniums with SWNTs is selective towards m-SWNTs but is not specific. For example, FIG. 1 shows the time-dependent change of absorption spectra of SWNTs with diameters from 1.2 to 1.4 nm reacting with bromobenzenediazonium tetrafluoroborate (BrBDT) of formula $N_2^+$—$C_6H_4$—Br, $BF_4^-$. The metal and semiconductor absorption peaks may be viewed respectively at 600-700 nm and at 900-1,000 nm, the successive spectra overlap. It may be noted that the peak of the m-SWNTs decreases more rapidly than the peak of sc-SWNTs, but the functionalization of m-SWNTs is not exclusively possible. The m-SWNT vs. sc-SWNT selectivity, herein defined as the ratio of the reaction rate of m-SWNTs vs. that of sc-SWNTs, extends from 2 to 4 depending on the substituent of the aryl diazonium (the selectivity is 3 in FIG. 1) but depends neither on the diazonium concentration nor on the SWNT concentration.

With their investigations, the Applicant has shown that by not using a diazonium salt but using a derivative of a diazonium salt, the selectivity may pass from a factor comprised between 2 and 4 to a factor comprised between 6.4 and 15 (data of Table 1 hereinafter). The fact that the improvement of the selectivity and therefore of the specificity is mainly due to the use of a diazonium salt derivative was confirmed experimentally.

The present invention therefore relates to a method for separating metal carbon nanotubes with a single graphene layer (m-SWNTs) and semiconductor nanotubes with a single graphene layer (sc-SWNTs) comprising a step consisting of reacting a diazonium salt derivative on a mixture of m-SWNTs and of sc-SWNTs. Advantageously, said step consists of reacting by radical chemical grafting, a diazonium salt derivative on a mixture of m-SWNTs and of sc-SWNTs.

The present invention relates to a method for separating metal carbon nanotubes with a single graphene layer (m-SWNT) and semiconductor nanotubes with a single graphene layer (sc-SWNT) comprising a step for grafting a diazonium salt derivative on a mixture of m-SWNTs and of sc-SWNTs so as to obtain a mixture of grafted m-SWNTs and of non-grafted sc-SWNTs, by the means of which the grafted m-SWNTs and the non-grafted sc-SWNTs separate because of differential chemical and/or physical properties caused by said grafting. Advantageously, the applied grafting is radical chemical grafting.

By "separation method", is meant within the scope of the present invention, both a physical separation method and a method allowing m-SWNTs to be distinguished from sc-SWNTs in a same mixture. This separation is based on the differential chemical and/or physical properties between the selectively and specifically grafted m-SWNTs and the non-grafted sc-SWNTs. Examples of such properties will be given hereinafter.

The present invention applies to nanotubes with a single graphene layer (SWNT). One skilled in the art is aware of different techniques allowing preparation of such carbon nanotubes. As examples, mention may be made of physical methods based on the sublimation of carbon such as an electric arc, laser ablation methods or using a solar oven. These methods are described and explained from line 4, page 2 to line 25, page 3 in the international application WO 03/084869 [3].

Advantageously, the nanotubes applied within the scope of the prevent invention are carbon nanotubes with a single graphene layer having a length comprised between 10 nm and 400 μm, notably between 20 nm and 200 μm, in particular between 50 nm and 100 μm and most particularly between 100 nm and 80 μm and a diameter comprised between 0.2 and 6 nm, notably between 0.6 and 4 nm and in particular between 1 and 2 nm.

By "diazonium salt derivative", is meant within the scope of the present invention a product obtained by reaction of a diazonium salt with a compound C selected from the group consisting of an organic acid, a sulfoxide, an alcohol and one of their salts. Indeed, the organic acid, the sulfoxide or the alcohol may appear as salts.

Advantageously, said organic acid is selected from the group consisting of a carboxylic acid, a phosphonic acid, a sulfonic acid.

By "carboxylic acid" is meant within the scope of the present invention, a compound of formula $R_1$—COOH wherein $R_1$ represents a hydrocarbon group from 1 to 20 carbon atoms such as an alkyl group, an alkenyl group, an alkoxy group, an aryl group, an aryloxy group or a carboxylic group.

By "phosphonic acid" is meant within the scope of the present invention, a compound of formula $R_2$—PO(—OH)$_2$ wherein $R_2$ represents a hydrocarbon group from 1 to 20 carbon atoms such as an alkyl group, an alkenyl group, an alkoxy group, an aryl group or an aryloxy group.

By "sulfonic acid" is meant within the scope of the present invention, a compound of formula $R_3$—S(=O)$_2$OH wherein $R_3$ represents a hydrocarbon group from 1 to 20 carbon atoms such as an alkyl group, an alkenyl group, an alkoxy group, an aryl group or an aryloxy group.

By "sulfoxide" is meant within the scope of the present invention, a compound of formula $R_4(R_5)$S=O wherein $R_4$ and $R_5$ represent independently of each other, a hydrocarbon group from 1 to 20 carbon atoms such as an alkyl group, an alkenyl group, an alkoxy group, an aryl group or an aryloxy group.

By "alcohol" is meant within the scope of the present invention, a compound of formula $(R_7R_8R_9)$C—OH wherein $R_7$, $R_8$, and $R_9$ independently represent an alkyl group or a hydrogen.

By "alkyl group" is meant within the scope of the present invention, a linear, branched or cyclic alkyl group, optionally substituted, with from 1 to 20 carbon atoms, notably from 1 to 15 carbon atoms, and in particular from 1 to 10 carbon atoms.

By "alkenyl group" is meant, within the scope of the present invention, a linear, branched or cyclic alkenyl group, optionally substituted, with from 2 to 20 carbon atoms, notably from 2 to 15 carbon atoms and in particular from 2 to 10 carbon atoms.

By "alkoxy group", is meant, within the scope of the present invention, an oxygen atom substituted with an alkyl as defined earlier.

By "aryl group" is meant within the scope of the present invention, an aromatic or heteroaromatic, mono- or polycyclic group, optionally substituted, having from 6 to 20 carbon atoms, notably from 6 to 14 carbon atoms, in particular, from 6 to 8 carbon atoms. The heteroatom(s) which may be present in the aryl group is (are) advantageously selected from the group consisting of N, O, P or S. In the case of a polycyclic aromatic or heteroaromatic group, each ring may comprise from 3 to 8 carbon atoms.

By "aryloxy group" is meant, within the scope of the present invention, an oxygen atom substituted with an aryl as defined earlier.

By "carboxylic group", is meant within the scope of the present invention, a group of formula —COOH.

By "optionally substituted" is meant, within the scope of the present invention, a radical substituted with one or more groups selected from a group containing one or more heteroatoms, such as N, O, F, Cl, P, Si, Br or S; an alkyl group; an alkoxy group; a halogen; a hydroxy; a cyano; a trifluoromethyl; a carboxylic group or a nitro group.

By "halogen" is meant, within the scope of the present invention, a fluorine, chlorine, bromine, or iodine atom.

Any diazonium salt known to one skilled in the art may be used for preparing the diazonium salt derivative implemented in the method according to the present invention.

Advantageously, the diazonium salt is an aryl diazonium salt and notably an aryl diazonium salt of formula (I):

$$R_6—N_2^+,A^- \quad (I)$$

wherein:
A represents a monovalent anion and
$R_6$ represents an aryl group as defined earlier.

Within the aryl diazonium salts and notably the compounds of formula (I) above, $R_6$ is preferably selected from aryl groups substituted with electron attractor groups such as $NO_2$, COH, ketones, CN, $CO_2H$, $NH_2$ (as $NH_3^-$), esters and halogens. The more preferred groups $R_6$ of the aryl type are nitrophenyl, benzoic acid, methylbenzoic and bromophenyl groups.

Within the compounds of formula (I) above, A may notably be selected from inorganic anions such as halides like I$^-$, Br$^-$ and Cl$^-$, halogenoborates such as tetrafluoroborate, perchlorates and sulfonates and organic anions such as alcoholates, carboxylates.

As compounds of formula (I), it is particularly advantageous to use a compound selected from the group formed by methoxybenzenediazonium tetrafluoroborate, phenyldiazonium tetrafluoroborate, 4-nitrophenyldiazonium tetrafluoroborate, 4-bromo-phenyldiazonium tetrafluoroborate, 4-aminophenyl-diazonium chloride, 2-methyl-4-chlorophenyldiazonium chloride, 4-benzoylbenzenediazonium tetrafluoroborate, 4-cyanophenyldiazonium tetrafluoroborate, 4-carboxy-phenyldiazonium tetrafluoroborate, 4-acetamidophenyl-diazonium tetrafluoroborate, diazonium 4-phenylacetic acid tetrafluoroborate, 2-methyl-4-[(2-methylphenyl)-diazenyl]benzenediazonium sulfate, 9,10-dioxo-9,10-dihydro-1-anthracenediazonium chloride, 4-nitronaphthalenediazonium tetrafluoroborate and naphthalenediazonium tetrafluoroborate.

The preparation of the diazonium salt derivative used within the scope of the present invention is advantageously accomplished before applying the method according to the invention.

As an example of such a technique, mention may be made of the method comprising the following steps consisting of:

i) dissolving the diazonium salt as defined earlier in order to form a solution $S_0$;

ii) putting the solution $S_0$ into contact with a compound C as defined earlier;

iii) putting the mixture obtained in step (ii) under conditions allowing the formation of a diazonium salt derivative and thereby obtaining a solution $S_1$.

Advantageously, the solution $S_0$ comprises, as a solvent, a polar solvent, preferably the latter will be a protic solvent.

By "polar solvent", is meant, within the scope of the present invention, a solvent which has a large dielectric constant, generally the latter is greater than 7 and preferably greater than 15.

By "protic solvent", is meant, within the scope of the present invention, a solvent which includes at least one hydrogen atom which may be released as a proton.

The protic solvent is advantageously selected from the group consisting of acidified or basic water, acidified or basic deionized water, acidified or basic distilled water, acetic acid, hydroxylated solvents such as methanol and ethanol, liquid glycols of low molecular weight such as ethylene glycol, and mixtures thereof. In a first alternative, the protic solvent used within the scope of present invention is only formed by a protic solvent or by a mixture of different protic solvents. In another alternative, the protic solvent or the mixture of protic solvents may be used as a mixture with at least one aprotic solvent, it being understood that the resulting mixture has the characteristics of a protic solvent. Preferably, distilled and/or deionized water is the preferred protic solvent.

By "aprotic solvent", is meant, within the scope of the present invention, a solvent which is not considered as protic. Such solvents are not able to release a proton or to accept one under non-extreme conditions.

The aprotic solvent is advantageously selected from dimethylformamide (DMF), acetone, acetonitrile and dimethyl sulfoxide (DMSO). According to a particular embodiment, the solvent may correspond to an organic acid, a sulfoxide or an alcohol as defined earlier.

An alternative step (i) consists of preparing the diazonium salt in situ. Indeed, a diazonium salt may be prepared from a precursor of said diazonium salt. By "diazonium salt precursor", it should be understood a molecule separated from the diazonium salt by a single and easy-to-apply operating step. Thus, as a precursor, an arylamine may be used, which may include several amine substituents which give an aryl diazonium salt by reaction with $NaNO_2$ in an acid medium. For a detailed discussion of the experimental methods which may be used for such a preparation in situ, one skilled in the art may refer to the open literature (Lyskawa and Belanger, 2006 [14]).

During step (ii), the compound C is typically added in excess relatively to the diazonium salt. By "excess", is meant, within the scope of the present invention, a concentration of compound C which is 50 times, notably 20 times, in particular 10 times and more particularly 5 times greater than the concentration of the diazonium salt in the solution $S_0$.

The conditions allowing the formation of a diazonium salt derivative from a diazonium salt and from a compound C, generally correspond to simply putting the reaction partners in presence in the reaction medium. It is preferable to use an excess of compound C.

When a diazonium salt $R-C_6H_4-N_2^+$ is added to an organic acid or to its salt, like acetic acid $CH_3-COOH$, it seems that the diazonium salt reacts with the acid in order to form a compound of the ester type such as $R-C_6H_4-N_2-O-CO-CH_3$ in the case of acetic acid. Such esters have been discovered and studied for 40 years as intermediates in the decomposition of nitrosoacetanilides (Gomberg and Bachmann, 1924 [15]). The formation of the diazonium ester is discovered via the stabilization of the diazonium reagent. Indeed, diazonium salts rapidly decompose in aqueous solutions, forming an orange precipitate. On the contrary, solutions of diazonium salts in the presence of an excess of acid compounds such as acetic acid are colorless or yellow and remain transparent and stable for several days.

Close mechanisms may be contemplated for alcohols and sulfoxides in order to lead to ethers. However, to this day, there still exist uncertainties on the exact structure of the diazonium salt derivatives which are formed from diazonium salts and from sulfoxides or alcohols.

The preferred sulfoxides are those for which $R_4$ and $R_5$ are alkyl groups, either identical or different.

In the case of alcohols, it is preferable to use primary alcohols. Advantageously, these are alcohols having a non-branched, preferably non-substituted, alkyl chain.

The reaction temperature is generally less than 50° C., in particular less than 40° C. and, more particularly less than 30° C. Advantageously, the temperature during step (iii) is room temperature. By "room temperature", is meant a temperature of 20° C.±5° C.

Step (iii) depending on the applied conditions and notably proportionally to temperature, lasts for 1 min to 1 h, notably from 4 min to 30 min and in particular from 6 min to 15 min.

Advantageously, the preparation of the diazonium salt derivative is carried out in an acid medium.

By "in an acid medium", is meant, within the scope of the present invention, in the presence of an inorganic acid, notably selected from the group consisting of hydrochloric acid, sulfuric acid, nitric acid and hydrofluoric acid, in an amount comprised between $10^{-4}$ and 1 M, advantageously between $10^{-3}$ and 0.6 M and in particular, between $10^{-2}$ and 0.4 M.

The reaction of the diazonium salt derivative on carbon nanotubes (m-SWNT and sc-SWNTs) according to the present invention applies radical chemical grafting. More particularly, this step consists of subjecting, in the presence of carbon nanotubes (m-SWNTs and sc-SWNTs), the diazonium salt derivative to non-electrochemical conditions allowing the formation of at least one radical entity from said derivative. The formation of this radical entity is accomplished in the absence of application of any electric voltage at the nanotubes or in the reaction medium.

The term of "radical chemical grafting" notably refers to the use of molecular entities derived from the diazonium salt derivative, having a non-paired electron, or capable of producing them, in order to form bonds of the covalent bond type with the surface of the nanotubes.

The grafting step implements a solution $S_2$ which comprises the carbon nanotubes and the diazonium salt derivative (also called "reaction medium" herein). This solution $S_2$ comprises as a solvent, a polar solvent, preferably a protic solvent as defined earlier.

The non-electrochemical conditions allow the formation of at least one radical entity from the diazonium salt derivative in the grafting step of the method of the present invention, are conditions which allow the formation of radical entities from the diazonium salt derivative.

These conditions involve parameters such as for example temperature, nature of the solvent, presence of a particular additive, stirring, pressure when the electric current is not involved during the formation of the radical entities. Conditions which allow formation of radical entities are numerous and this type of reaction is known and investigated in detail in the prior art.

Thus for example it is possible to act on the thermal, kinetic, chemical, photochemical or radiochemical environment of the diazonium salt derivative in order to destabilize it so as to form a radical entity. Of course, it is possible to act on several of these parameters simultaneously.

Within the scope of the present invention, the non-electrochemical conditions allowing the formation of radical entities during the grafting step according to the invention are typically selected from the group consisting of thermal, kinetic, chemical, photochemical, radiochemical conditions and combinations thereof. Advantageously, the conditions applied within the scope of the grafting step of the method according to the present invention are kinetic conditions.

The thermal environment depends on temperature. It is easy to control it with heating means customarily used by one skilled in the art. The use of a thermostatic environment has a particular advantage since it allows specific control of the reaction conditions.

The kinetic environment essentially corresponds to the stirring of the system and to the frictional forces. Here, this is not the stirring of the molecules per se (elongation of bonds, etc), but the overall movement of the molecules. The application of a pressure or the stirring of the reaction medium notably gives the possibility of providing energy to the system so that the diazonium salt derivative is destabilized and may form radical reactive species.

Thus, during said grafting step, the solution $S_2$ is subject to mechanical stirring and/or to a treatment with ultrasound. In a first alternative, the suspension applied during the grafting step is subject to a high speed of rotation by means of a magnetic stirrer and/or a magnetized bar and this for a duration comprised between 5 min and 10 h of stirring, notably comprised between 10 min and 5 h and, in particular between 15 min and 4 h. In a second alternative, the suspension applied during the grafting step is subject to a treatment with ultrasound notably by using an ultrasonic tank, typically with an absorption power of 500 W and at a frequency of 25 or 45 kHz and this, for a duration comprised between 5 min and 10 h of stirring, notably comprised between 15 min and 8 h and, in particular between 30 min and 5 h.

Finally, the action of various radiations such as electromagnetic radiations, γ radiations, UV rays, electron or ion beams may also sufficiently destabilize the diazonium salt derivative so that it forms radicals. The selection of a suitable wavelength depending on the diazonium salt derivative used is within the skills of one skilled in the art.

Within the scope of chemical conditions, one or more chemical initiators are used in the reaction medium. The presence of chemical initiators is often coupled with non-chemical environmental conditions as discussed above. Typically, a chemical initiator, the stability of which is less than that of the diazonium salt derivative under selected environmental conditions, will change over time into an unstable form which will act on the diazonium salt derivative and will generate the formation of radical entities from the latter. It is also possible to use chemical initiators, the action of which is not essentially related to the environmental conditions and which may act over wide ranges of thermal or further kinetic conditions. The initiator will preferably be adapted to the environment of the reaction, for example to the solvent used.

There exist many chemical initiators. Generally three types are distinguished depending on the environmental conditions used:

thermal initiators, the most common of which are peroxides or azoic compounds. Under the action of heat, these compounds dissociate into free radicals. In this case, the reaction is carried out at a minimum temperature corresponding to that required for forming radicals from the initiator. This type of chemical initiators is generally specifically used within a certain temperature interval, depending on the decomposition kinetics;

the photochemical or radiochemical initiators which are excited by radiation triggered by irradiation (most often by UVs, but also by γ radiations or electron beams) allow the production of radicals by more or less complex mechanisms. $Bu_3SnH$ and $I_2$ belong to the photochemical or radiochemical initiators;

essentially chemical initiators, this type of initiators acting rapidly and under normal temperature and pressure conditions on the diazonium salt derivative in order to allow it to form radicals. Such initiators generally have an oxidation-reduction potential which is less than the potential for reducing the diazonium salt derivative used under the reaction conditions. Depending on the nature of the diazonium salt derivative, it may also for example be a reducing metal, such as iron, zinc, nickel; a metallocene; an organic reducing agent such as hypophosphorous acid ($H_3PO_2$) or ascorbic acid; an organic or inorganic base in sufficient proportions so as to allow destabilization of the diazonium salt derivative. Advantageously, the reducing metal used as a chemical initiator appears in a finely divided form, such as metal wool (also more commonly called metal "flake") or metal filings. Generally, when an organic or inorganic base is used as a chemical initiator, a pH greater than or equal to 4 is generally sufficient. Structures of the radical reservoir type, such as polymeric matrices irradiated beforehand with an electron beam or with a heavy ion beam and/or by the whole of the irradiation means mentioned earlier, may also be used as chemical initiators for destabilizing the diazonium salt derivative and leading to the formation of radical entities from the latter.

The grafting step of the method according to the present invention is notably applied at a temperature of less than 50° C., in particular less than 40° C. and more particularly less than 30° C. Advantageously, the temperature during the grafting step is room temperature.

During the grafting step of the method according to the present invention, the carbon nanotubes are present in the solution $S_2$ in an amount comprised between $1.10^{-5}$ and 1 g/L, notably between $1.10^{-4}$ and $1.10^{-1}$ g/L and, in particular between $1.10^{-3}$ and $5.10^{-2}$ g/L of solution $S_2$.

During the grafting step of the method according to the present invention, the solution $S_2$ may comprise a single diazonium salt derivative or a mixture of at least two, notably of at least three and even at least four different diazonium salt derivatives. The amount of diazonium salt derivative(s) in the solution $S_2$ is comprised between $1.10^{-7}$ and $1.10^{-1}$ M, notably between $1.10^{-6}$ and $1.10^{-2}$ M and, in particular between $1.10^{-5}$ and $1.10^{-3}$ M.

The grafting step according to the method of the present invention may be stopped before all the radical entities derived from the diazonium salt derivatives have preferentially bound to the m-SWNTs. One skilled in the art is aware of various techniques allowing the grafting step to be stopped and will be able to determine the most suitable technique depending on the diazonium salt derivative applied in the grafting step. As an example of such techniques, mention may be made of a change in pH of the solution $S_2$ notably by adding an acid solution thereto (for example, acid water with a pH of less than 3) or removal of the diazonium salt derivatives present in the solution $S_2$ (for example by precipitation or by complexation).

For this purpose, an alternative of the diazoic coupling reaction used for more than 100 years for making coloring agents, may be used. In this technique, optionally substituted naphthol is added to a solution $S_2$ and it seems that the latter binds to the terminal nitrogen of the diazonium salt derivative and of the optionally present diazonium via a carbon of the naphthalene ring close to the hydroxyl so as to give a colored compound. The optionally substituted naphthol is used in the solution $S_2$ at a concentration comprised between 0.1 and 100 mM and notably between 1 and 10 mM.

More particularly, the method of the present invention comprises the successive steps consisting of:
a) putting a solution $S_3$ comprising a mixture of m-SWNTs and of sc-SWNTs in contact with at least one diazonium salt derivative;
b) reacting, by radical chemical grafting, said diazonium salt derivative on said mixture of m-SWNTs and of sc-SWNTs according to the grafting step as defined earlier;
c) optionally, purifying the grafted m-SWNTs and/or the sc-SWNTs.

In other terms, the method of the present invention comprises the following steps consisting of:
a) putting a solution $S_3$ comprising a mixture of m-SWNTs and of sc-SWNTs in contact with at least one diazonium salt derivative;
b) grafting, via radical chemical grafting, said diazonium salt derivative on said mixture of m-SWNTs and of sc-SWNTs according to the grafting step as defined earlier so as to obtain a mixture of grafted m-SWNTs and of non-grafted sc-SWNTs;
c) optionally, purifying the grafted m-SWNTs and/or the non-grafted sc-SWNTs on the basis of differential chemical and/or physical properties caused by said grafting.

As explained earlier, the separation method according to the present invention includes a method allowing m-SWNTs to be distinguished from the sc-SWNTs in a same mixture. For this reason in the method according to the invention, the purification step (c) is optional.

The m-SWNT/sc-SWNT ratio in the mixture of carbon nanotubes applied during step (a) of the method according to the invention is variable and may notably depend on the conditions used during the preparation of these nanotubes.

During step (a) of the method according to the invention, the SWNT nanotubes are typically present in the solution $S_3$, in an amount comprised between $1.10^{-5}$ and 1 g/L, notably between $1.10^{-4}$ and $1.10^{-4}$ g/L and, in particular between $1.10^{-3}$ and $5.10^{-2}$ g/L of solution $S_3$.

Advantageously, the solution $S_3$ contains as a solvent, a polar solvent, preferably a protic solvent as defined earlier.

Further, the solution $S_3$ may further comprise a dispersant. Such an agent allows solubilization of the mixture of carbon nanotubes applied within the scope of the present invention and its maintenance as a stable suspension. By "stable suspension", is meant within the scope of the present invention a suspension in which the nanotubes do not settle or very little visibly and remain in suspension for a few minutes, for a few hours, for several days or even for several weeks.

Any dispersant known to one skilled in the art may be used within the scope of the solution $S_3$ and notably any agent known for dispersing lipids or proteins in aqueous solutions. The international application WO 03/006725 [16] describes dispersants used for preparing stable solutions of nanotubes. Advantageously, the dispersant applied within the scope of the present invention is selected from the group consisting of natural or synthetic surfactants and detergents. More particularly, the dispersant applied within the scope of the present invention is selected from the group consisting of poloxamers such as poloxamer F127 and sorbitol polyoxyethylene esters such as those marketed under the brand of TWEEN® or EMASOL™.

The dispersant is present in the solution $S_3$ in an amount comprised between 0.1 and 10%, notably between 0.5 and 7% and in particular between 1 and 4% by mass based on the mass of solution $S_3$.

It is clear for one skilled in the art that the solution $S_2$ in which the grafting step is applied, may correspond to the solution resulting from the mixture of the solution $S_3$, which contains the mixture of sc-SWNT and m-SWNT nanotubes, and of the solution $S_1$, in which was prepared the diazonium salt derivative. Advantageously, these three solutions contain a same solvent, notably a same polar solvent, preferably a protic solvent and in particular, distilled water.

During the step (a) of the method according to the invention, the amounts of solution $S_3$ containing the nanotubes and of solution S1 containing the diazonium salt derivative, used, are variable. One skilled in the art will be able to determine without any inventive effort, the amounts to be applied of each of these solutions notably according to the amount of nanotubes in the solution $S_3$ and to the concentration of diazonium salt derivative in the solution $S_1$. Advantageously, the solution $S_3$/solution $S_1$ ratio is comprised between 99/1 and 1/99, notably between 95/5 and 5/95 and in particular between 90/10 and 10/90.

The step (a) of the method according to present invention is notably applied at a temperature of less than 50° C., in particular less than 40° C. and, more particularly, of less than 30° C. Advantageously, the step (a) of the method according to the present invention is carried out at room temperature.

It is possible to use the mixture obtained after the grafting step i.e. after step (b) of the method according to the invention, as such.

Indeed, following the grafting step of the method according to the invention, the chemical and/or physical properties of the m-SWNTs may be modified by reaction with the diazonium salt derivatives, while the sc-SWNTs are preserved by means of the selectivity and specificity of said grafting. Also, the mixture of grafted m-SWNTs and of sc-SWNTs may be considered as a source of "pure" sc-SWNTs. Such a mixture may therefore be used in electronic devices and notably in the making of transistors.

Step (c) of the method according to the present invention aims at using the selectivity and specificity of the grafting of the diazonium salt derivative on the m-SWNTs and the differential chemical and/or physical properties caused by said grafting. The step (c) of the method according to the present invention may apply at least one technique selected from separation techniques based on chemical affinity, on filtration, on centrifugation, on electrophoresis and/or on chromatography.

The separation methods known in the state of the art and notably the method described in patent application JP 2007 031238 [12] using the coupling of metal nanoparticles with the aryl entities of the aryl diazonium salt derivative grafted on the nanotubes may also be used during step (c) of the method of the invention.

Also, by wisely selecting the structure of the diazonium salt and incidentally of that of the diazonium salt derivative implemented in the invention, it is possible to contemplate having a structure which directly bears a charge which may be used with view to separation by ion exchange chromatography or which bears a group $G_1$ capable of complexing with or having affinity for another group $G_2$, said group $G_2$ being able to be grafted on one column.

It is also possible, during the grafting step to add to the solution $S_2$, monomeric, organic species, polymerizable via a radical route, capable of forming a polymer under radical conditions from derivatives grafted on the m-SWNTs. Typically, these are molecules including at least one bond of the ethylene type. Following this polymerisation, the nanotubes without any polymer i.e. the sc-SWNTs, may be precipitated.

Finally, the experimental part proposes a method for separating grafted m-SWNTs and sc-SWNTs. This method is based on a reduction by tin dichloride of the grafted $NO_2$ groups on the m-SWNTs.

Prior to the step (a) of the method according to the invention and subsequently to their preparation, the carbon nanotubes may undergo a treatment notably for removing the metal catalyst particles and the carbon used during this preparation. Thus, any technique known to one skilled in the art allowing such purification may be used within the scope of the present invention.

As examples of purification methods which may be used, the method hereafter allows carbon nanotube suspensions to be obtained with good quality or even higher quality than that of suspensions prepared by these techniques of the state of the art. This method comprises a treatment of the sc-SWNT and m-SWNT mixture with nitric acid and size-exclusion chromatography of the mixture of sc-SWNTs and of m-SWNTs following the treatment with nitric acid. It is also possible to apply an ultrasonic treatment before, during and/or after exposure to nitric acid.

More particularly, the method for treating SWNTs prior to the separation method according to the invention, comprises the successive steps consisting of:

i') putting a suspension of a mixture of m-SWNTs and sc-SWNTs in contact with a solution containing nitric acid;

ii') heating the solution obtained in step (i') and then cooling it;

iii') filtering the solution obtained in step (ii') and suspending the filtrate in a solution with a basic pH;

iv') filtering the suspension obtained in step (iii') and suspending the filtrate in a solution containing a dispersant as defined earlier;

v') subjecting the solution obtained in step (iv') to size-exclusion chromatography.

The preparation of the different suspensions applied in this method and step (ii') are subject to stirring. Any mechanical technique allowing dispersion and suspension of the carbon nanotubes may be used for this purpose. As examples of such techniques, manual stirring, treatment with ultrasound, mechanical stirring or a combination of such techniques may be mentioned. These techniques may require the use of a magnetic stirrer and of a magnetized bar or an ultrasonic bath or of a mechanical stirrer with rods, vanes, propellers, etc. These mechanical stirring techniques with view to dispersion may last for 1 to 30 min, notably from 2 to 15 min. It is also possible to heat the medium, typically around 80° C. The application of ultrasonic and heating treatment cycles, for example 5 to 20 cycles, preferably 10, over a period from 12 to 36 h, preferably 24 h, gives the possibility of obtaining highly satisfactory dispersions.

During step (i'), the solution containing nitric acid typically comprises as a solvent, a protic solvent as defined earlier. Nitric acid is generally present in this solution in an amount comprised between 20 and 70%, notably between 30 and 60%, in particular, between 40 and 50% and, more particularly of the order of 45% (i.e. 45%±3%). The suspension of nanotubes is advantageously prepared in a solution comprising, as a solvent, a protic solvent as defined earlier. Further, the amount of nanotubes in the solution is comprised between 0.5 and 100 g/L, notably between 0.5 and 50 g/L and, in particular of the order of 1 g/L of suspension (i.e. 1 g/L±0.5 g/L). The volume ratio (solution containing nitric acid)/(suspension of nanotubes) is typically comprised between 10/0.1 and 10/10, notably between 10/0.5 and 10/5 and, in particular about 10/1.

Step (ii') generally first of all consists of refluxing the mixture of nanotubes and of nitric acid. This substep lasts for typically 1 h to 12 h, notably from 2 h to 6 h and, in particular of the order of 4 h (i.e. 4 h±30 min). Any technique known to one skilled in the art giving the possibility of cooling a liquid may be used for cooling the mixture after this heating substep. As examples, an ice bath and/or the addition of an iced water solution may be used.

The cooled mixture obtained after step (ii') is filtered by any filtration technique known to one skilled in the art and, notably, by using a filtration membrane such as a filtration membrane in hydrophilic polypropylene advantageously with a porosity of 0.45 μm. The solution of sodium hydroxide applied in step (iii') comprises, as a solvent, a protic solvent as defined earlier. The solution is preferably buffered to a basic pH generally greater than 8 and advantageously greater than 10. The buffer may be made with different salts such as sodium and potassium hydroxides and carbonates. For example sodium hydroxide is present in this solution in an amount comprised between $1.10^{-2}$ and 10 g/L, notably between $1.10^{-1}$ and 1 g/L and, in particular of the order of 0.5 g/L of solution (i.e. 0.5 g/L±0.1 g/L). The step (iii') may be repeated several times and this as long as the filtrate is grey.

Step (iv') consists of putting the last filtrate in a solution containing a dispersant as defined earlier. This solution generally comprises as a solvent, a protic solvent as defined earlier. The dispersant is present in the solution in an amount comprised between 0.1 and 10%, notably between 0.5 and 7% and, in particular between 1 and 4% by mass based on the mass of this solution. Before applying step (v'), it is preferable that the solution containing the nanotubes and the dispersant be heated to a temperature greater than 40° C., notably greater than 50° C. and, in particular of the order of 70° C. (i.e. 70° C.±10° C.) and this at least twice, advantageously three times.

Any size-exclusion chromatography technique known to one skilled in the art and any equipment suitable for this technique may be used during step (v') of the method.

The present invention also relates to a mixture of grafted m-SWNTs and of sc-SWNTs which may be obtained subsequently to step (b) of a method as defined earlier.

The present invention also relates to a kit for separating the m-SWNTs and the sc-SWNTs contained in a mixture.

In a first alternative, such a kit notably comprises:

α) in a first compartment, a solution containing at least one diazonium salt derivative as defined earlier, β) in a second compartment a solution containing at least one agent capable of stopping the reaction, by radical chemical grafting, of the diazonium salt derivative on the m-SWNTs and the sc-SWNTs.

In a second alternative of the kit according to the invention, the latter notably comprises:

α') in a first compartment, a diazonium salt as defined earlier or one of its precursors as defined earlier;

β') in a second compartment, a compound C selected from the group consisting of an organic acid, a sulfoxide, an alcohol and one of their salts, as defined earlier;

γ') in a third compartment, a solution containing at least one agent capable of stopping the reaction, by radical chemical grafting, of the diazonium salt derivative on the m-SWNTs and the sc-SWNTs.

The agent capable of stopping the reaction, by radical chemical grafting, of the diazonium salt derivative is advantageously selected from pH modifiers and agents complexing or reacting with the derivative of the diazonium salt, such as naphthol, optionally substituted.

Both alternatives of the kit according to the invention may comprise at least one other compartment in which will be found at least one element selected from the group consisting of a mixture of m-SWNTs and of sc-SWNTs, a dispersant, a solution which may be used for purifying the m-SWNT and sc-SWNT mixture before the method according to the invention, a solution allowing transformation of the diazonium salt precursor into a diazonium salt and a solution which may be used during at least one step of the method according to the invention.

Other characteristics and advantages of the present invention will further become apparent to one skilled in the art upon reading the examples given below as an illustration and not as a limitation, with reference to the appended figures.

SHORT DESCRIPTION OF THE DRAWINGS

FIG. 5 shows a comparison of the selectivity M vs. Sc in the reaction of SWNTs with a diazonium salt or a diazonium salt derivative. The relative height of the peak at 940 nm is illustrated as a function of the relative height of the peak at 688 nm.

FIG. 7 shows the separation of the m-SWNTs and of the sc-SWNTs.

DETAILED DESCRIPTION OF CERTAIN ILLUSTRATIVE EMBODIMENTS

1. Preparation of the SWNT Solution.

The single wall carbon nanotubes (SWNT) are purified by treatment with nitric acid in order to remove the metal catalyst particles and amorphous carbon, and then by size-exclusion chromatography for removing the remaining amorphous carbon particles. 100 mg of crude SWNTs (purchased from Nanoledge, France) are suspended in 10 mL of pure water by treatment with the ultrasonic bath (80 W, 45 kHz, maximum power) for 30 min. The suspension is diluted in a mixture of 70 mL of nitric acid concentrated to 65% and of 30 mL of pure water. The whole is refluxed for 4 h under magnetic stirring. The suspension was then cooled in an ice bath, diluted by adding 110 mL of pure iced water and then filtered in vacuo over a filtration membrane in hydrophilic polypropylene with a porosity of 0.45 µm (PALL membranes, USA). The filtration residue is re-suspended in a solution of sodium hydroxide (100 mg of NaOH in 200 mL of pure water) by a 2 min treatment in an ultrasonic bath (same conditions as above) and then again filtered (same conditions as above). The residue is rinsed with the sodium hydroxide solution as long as the filtrate is grey and it is then rinsed with a small amount of pure water and stored in the humid state in a closed container.

One quarter of the black residue is suspended in 20 mL of F127 poloxamer solution (2% by mass in pure water), and treated with 3 heating cycles at 70° C. followed by 10 min in the ultrasonic bath. The solution is then purified by size-exclusion chromatography on a Sephacryl S-400 column (GE Healthcare, France) with a diameter of 4 cm and a height of 2.5 cm. The SWNTs are eluted with a 2% F127 solution in pure water heated to 50° C. The fractions of the first dark peak are collected and used as a stock solution of SWNTs.

The concentration and the purity of the SWNT solutions are tested by absorption spectroscopy. The concentration is determined by the mass absorption coefficient $\in$ (940 nm)=19.1 $L \cdot g^{-1} \cdot cm^{-1}$. The purity is estimated from the ratio of the height of the peak at 940 nm (determined according to the procedure described in the following paragraph) and the absorbance at 940 nm. This ratio is greater than or equal to 0.4 for good purity.

Certain nanotubes have undergone pre-treatment. The latter consists of subjecting the carbon nanotubes to ultrasound in solution in concentrated nitric acid. It was able to be carried out on the SWNTs before and after purification. The nitric acid concentration varied from 30% to 65% in water. The optimal duration of exposure to ultrasound depends on the power of the ultrasonic bath used and on the concentration of nitric acid. The following example gives typical conditions:

Crude SWNTs (9.4 mg: source: Nanoledge, diameters 1.2-1.4 nm) were dissolved in 10 mL of concentrated nitric acid (65% in water) and then placed in an ultrasonic bath (80 W, 45 kHz, maximum power) for 20 min. The treatment may be activated by adding iron wool (20 mg), iron wool is then removed after exposure to ultrasound by means of a magnetic bar. Distilled water (15 mL) was then added and the suspension was filtered in vacuo over a PTFE (polytetrafluoroethylene) filter with a porosity of 0.2 μm wetted beforehand with ethanol. The residue was rinsed three times with 20 mL of distilled water and the black filter was kept humid. The nanotubes were then treated with reflux in nitric acid and exclusion chromatography was carried out.

2. Tracking by Absorption Spectroscopy of the Reaction of the SWNTs with the Diazonium Salt Derivative The diazonium salts used are nitrobenzenediazonium tetrafluoroborate ($NO_2BDT$) bromobenzenediazonium tetrafluoroborate (BrBDT) and methoxybenzenediazonium tetrafluoroborate (MeOBDT). The acids used for forming a diazonium salt derivative are acetic acid, ammonium acetate, trifluoroacetic acid, paratoluenesulfonic acid, lactic acid, propylphosphonic acid, and oxalic acid. The dimethylsulfoxide (DMSO) was used as a sulfoxide and methanol and ethanol as alcohols. The control compounds are hydrochloric acid and sodium hydrogen carbonate.

The reaction of the SWNTs with diazonium is tracked in a quartz tank by absorption spectroscopy, for wavelengths between 320 and 1,250 nm.

The diazonium salt is dissolved in pure water at a concentration of 10 times the desired concentration. The acid, the sulfoxide or the alcohol are added in excess by at least 50 and the solution is left for preincubation for 10 min at room temperature for allowing the complete formation of the diazonium salt derivative. Finally, 80 μL of the solution are added in the quartz tank into 720 μL of SWNT solution with 2% F127 in pure water (usually 24 mg/L of SWNT, i.e. 2 mM of SWNT carbon atoms). The absorption spectra of the solution are recorded for 2 h.

In a control experiment, an SWNT solution sample is put into contact with a large amount of nitrobenzenediazonium tetrafluoroborate until the characteristic peaks of the SWNTs disappear from the absorption spectra. The reaction is stopped by adding naphthol (80 μL of a naphthol solution at 50 mM in an aqueous 2% F127 solution) and incubated for 10 min. The solution is then poured into 10 mL of ethanol in order to precipitate the SWNTs, filtered under vacuum over a polytetrafluoroethylene membrane with a porosity of 0.2 μm and rinsed with ethanol and pure water. The residue is taken up in 800 μL of a 2% F127 aqueous solution and treated with an ultrasonic bath (80 W, 10 min). The absorption spectrum of these SWNTs after complete reaction is then used as a "background spectrum" of the SWNTs and deducted from the spectra for measuring the height of the peaks.

Figure 2:
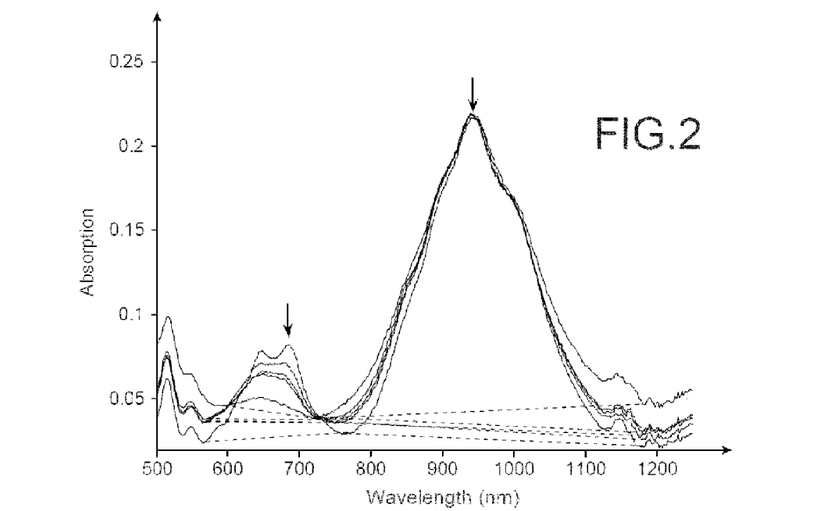
FIG. 2 shows the determination of the heights of the peaks for m- and sc-SWNTs at 688 and 940 nm respectively (marked by arrows) from the spectra corrected by the baseline of the complete reaction, in the reaction of SWNTs (Nanoledge, 22 mg/L) with a diazonium salt derivative (100 µM) obtained from a nitrobenzene diazonium salt and from dimethylsulfoxide in a 2% F127 aqueous solution at 27° C.

The height of the peaks is determined from the spectra for which the background spectrum of the SWNTs was deducted. A baseline tangent to this curve at the low points adjacent to the peak to be measured is plotted, as shown in FIG. 2, in order to take into account the drifting of the background during the reaction. The height of the peak is measured as the difference between the curve and the tangent line at the maximum absorption wavelength (940 nm for semiconductors, 688 nm for metals), the relative height of the peak at time t being the height of the peak at t divided by the height of the initial peak.

Figure 3:
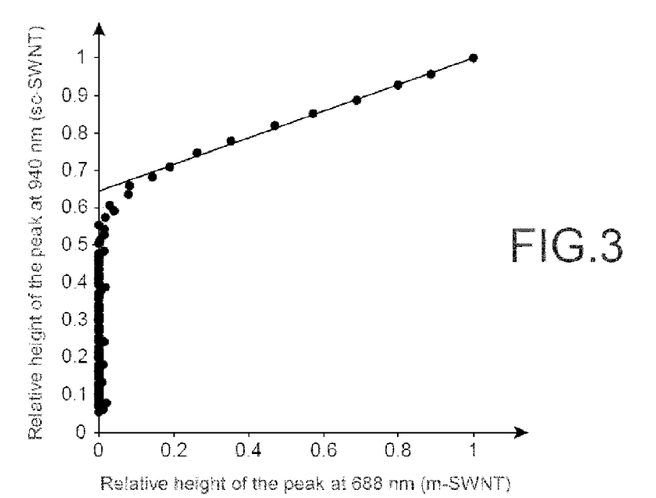
FIG. 3 shows the determination of the M vs. SC selectivity in the reaction of BrBDT (5 mM) with the SWNTs (57 mg/L) in a 2% F127 aqueous solution. The relative height of the peak at 940 nm (sc-SWNT) is illustrated as a function of the relative height of the peak at 688 nm (m-SWNT). The selectivity is defined as the reciprocal of the slope (2.8 in the present case).

The selectivity of the reaction is defined on the graph of the relative height of the peak of the semiconductor nanotubes (at 940 nm) plotted vs. the relative height of the peak of the metal nanotubes (at 688 nm), as shown in FIG. 3. This graph gives a line independent of the SWNT and diazonium concentration and the reciprocal of the slope thereof is the selectivity. It ranges from 2 to 4 in the case of the reaction of aryl diazonium tetrafluoroborate with the SWNTs (MeOBDT, BrBDT, $NO_2BDT$).

Figure 4:
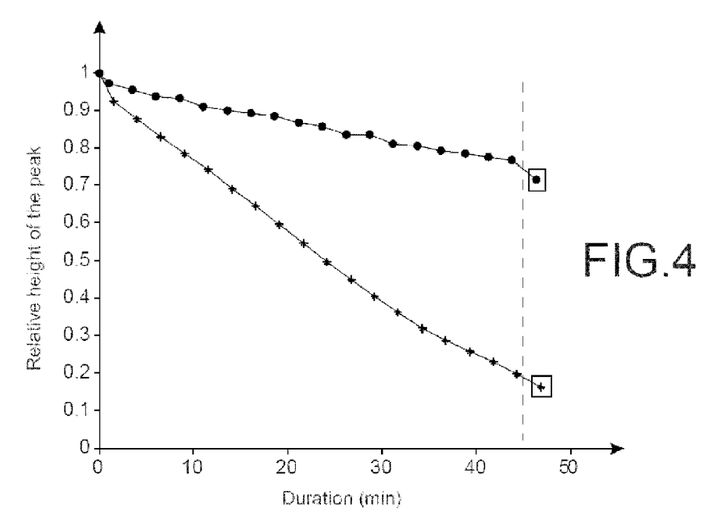
FIG. 4 shows the stopping of the reaction and the recovery of the functionalized SWNTs. The relative height of the m-SWNT peak (*) and of the sc-SWNT peak (○) is illustrated versus time during the reaction of SWNTs (18 mg/L) with BrBDT (1 mM) in a 2% F127 aqueous solution (800 µL). After 45 min (dotted line), 80 µL of a 50 mM solution of 2-naphthol are added and then 2.4 mL of ethanol. The solution is filtered and the residue is suspended in 800 µL of a 2% F127 aqueous solution (relative heights of the peaks marked with a square).

The reaction may be stopped by adding an excess of naphthol (typically a 100 μL of a 50 mM naphthol solution with 2% F127 in water) and the diazonium salt and the diazonium salt derivative are removed by precipitation of the SWNT by adding 2 volumes of ethanol and by filtration under vacuum. The relative height of the peaks is preserved after the stopping reaction and the filtration (FIG. 4, data surrounded by squares).

3. Selectivity of the Reaction of the SWNTs with the Diazonium Salt Derivatives.

Figure 5A:
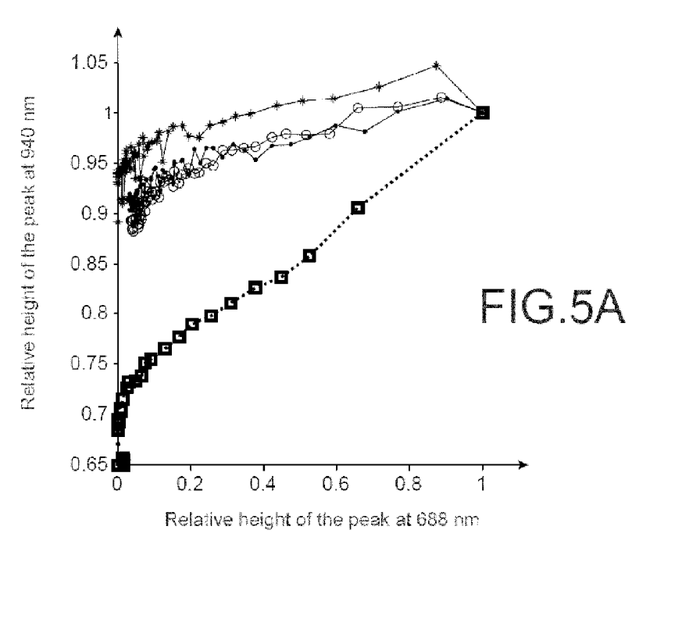
In FIG. 5A, the SWNTs (21 mg/L) are incubated either with 100 µM of $NO_2BDT$ (□), or with 100 µM of $NO_2BDT$ pre-incubated with 50 mM of trifluoroacetic acid for 1, 10 or 30 min (*, ●, ○ respectively).
Figure 5B:
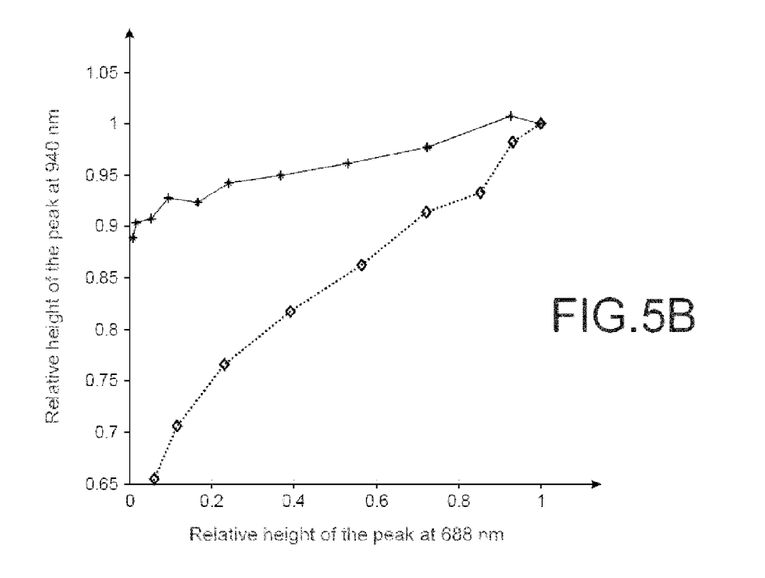
In FIG. 5B, the SWNTs (12 mg/L) are either incubated with 5 mM of BrBDT (◇), or with 5 mM of BrBDT in the presence of 500 mM of ammonium acetate (*).

Upon comparing the reaction of the diazonium salt with that of the derivatives of the corresponding diazonium salt with the SWNTs, the selectivity M vs. SC radically changes, as shown in FIG. 5. The plots of FIG. 5 show a decrease in the sc-SWNT peak as a function of the decrease in the m-SWNT peak. In graph A, the $NO_2BDT$ reaction (□) is compared with the reaction of the diazonium salt derivative obtained from trifluoroacetic acid and from nitrobenzenediazonium (*, ● and ○), the selectivity being improved by a factor of 3 in the case of the diazonium salt derivative. In graph B, the BrBDT reaction (◊) is compared with the reaction of the diazonium salt derivative obtained from acetic acid and bromobenzenediazonium (*) with the same improvement in selectivity.

Figure 6:
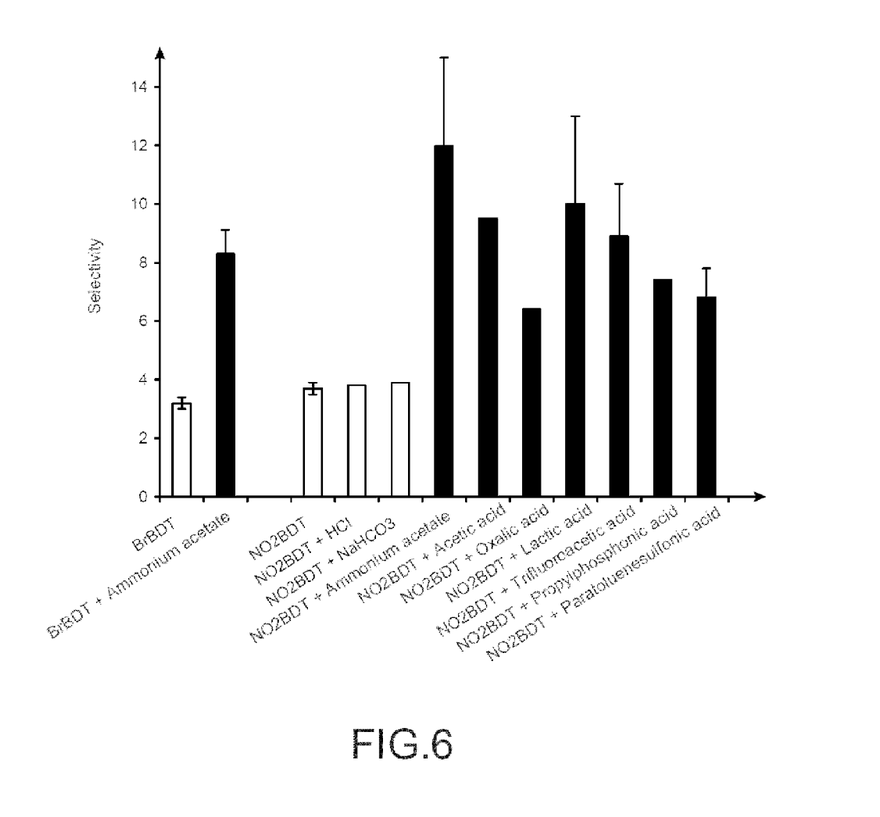
FIG. 6 shows a representation in the form of histograms of the selectivity M vs. Sc in the SWNT reaction either with diazonium salt (grey rectangles), or with diazonium salt derivatives (black rectangles). The SWNTs have reacted in a 2% F127 aqueous solution, either with a diazonium salt alone, or with a diazonium salt and an acid compound with or without incubation, as described in columns 1 to 5 of Table 1. The selectivity is calculated as described in FIG. 3, with the line adjustment parameters as given in column 7 and 8 of Table 1 hereafter.

A series of acid compounds was tested and the measured selectivities are copied into Table 1 hereafter and in FIG. 6. As compared with the reactivity of diazonium salts, the selectivity of the diazonium salt derivatives towards the m-SWNTs is increased by a factor from 2 to 4, which allows selective separation.

The SWNTs having undergone a pre-treatment have a selectivity of 6.6 and 8.4 (without or with activation by iron wool respectively) after reaction with 2 mM Br-BDT and 500 mM ammonium acetate.

TABLE 1

| 1<br>Compound used<br>for preparing<br>the derivative | 2<br>Diazonium<br>compound | 3<br>Incubation<br>(min) | 4<br>Diazonium<br>concentration<br>(mM) | 5<br>NT<br>concentration<br>(mg/l) | 6<br>Selectivity | 7<br>Number of<br>fitted points | 8<br>Correlation<br>coefficient R |
|---|---|---|---|---|---|---|---|
| — | BrBDT | | 1 | 21 | 2.86 | 11 | 0.997 |
| | | | 2 | 21 | 2.96 | 6 | 0.996 |

Curve fitting parameters span columns 7 and 8.

TABLE 1-continued

| 1<br>Compound used for preparing the derivative | 2<br>Diazonium compound | 3<br>Incubation (min) | 4<br>Diazonium concentration (mM) | 5<br>NT concentration (mg/l) | 6<br>Selectivity | 7<br>Number of fitted points | 8<br>Correlation coefficient R |
|---|---|---|---|---|---|---|---|
| | | | 5 | 5 | 3.48 | 6 | 0.994 |
| | | | 5 | 10 | 3.43 | 6 | 0.994 |
| | | | 5 | 15 | 3.25 | 7 | 0.997 |
| | | | 5 | 21 | 3.18 | 7 | 0.997 |
| | | | 10 | 21 | 3.16 | 7 | 0.993 |
| | | | 10 | 21 | 3.06 | 6 | 0.997 |
| | | | Average: 3.2 ± 0.2 | | | | |
| Ammonium acetate 0.5M | BrBDT | — | 1 | 21 | 7.49 | 29 | 0.979 |
| | | | 2 | 21 | 8.31 | 16 | 0.991 |
| | | | 5 | 5 | 8.11 | 8 | 0.93 |
| | | | 5 | 10 | 9.64 | 9 | 0.98 |
| | | | 5 | 21 | 7.63 | 26 | 0.97 |
| | | | 10 | 21 | 8.51 | 10 | 0.996 |
| | | | Average: 8.3 ± 0.8 | | | | |
| Ethanol 1% | BrBDT | 3' | 2 | 14 | 6.3 | 43 | 0.990 |
| — | $NO_2BDT$ | | 0.1 | 21 | 3.83 | 14 | 0.994 |
| | | | 0.5 | 21 | 3.62 | 5 | 0.994 |
| | | | Average: 3.7 ± 0.2 | | | | |
| HCl 50 mM | $NO_2BDT$ | 30' | 0.1 | 13 | 3.8 | 29 | 0.96 |
| $NaHCO_3$ 50 mM | $NO_2BDT$ | 10' | 0.1 | 13 | 3.9 | 12 | |
| MeOH 10% | $NO_2BDT$ | — | 0.1 | 18 | 11.7 | 25 | |
| Ammonium acetate 0.5M | $NO_2BDT$ | — | 0.1 | 21 | 7.1 | 8 | 0.95 |
| | | | 0.2 | 21 | 15.6 | 8 | 0.97 |
| | | | 0.2 | 10 | 11.6 | 8 | 0.93 |
| | | | 1 | 10 | 12.7 | 3 | 0.81 |
| | | | Average: 12 ± 3 | | | | |
| Acetic acid 0.43M | $NO_2BDT$ | — | 0.1 | 21 | 9.5 | 29 | 0.97 |
| Oxalic acid 50 mM | $NO_2BDT$ | 10' | 0.1 | 13 | 6.4 | 60 | 0.96 |
| Lactic acid 0.37M | $NO_2BDT$ | — | 0.1 | 21 | 12.2 | 30 | 0.97 |
| | | 5' | 0.1 | 21 | 11.8 | 30 | 0.98 |
| | | 10' | 0.1 | 13 | 7.16 | 50 | 0.88 |
| | | | Average: 10 ± 3 | | | | |
| $CF_3COOH$ 50 mM | $NO_2BDT$ | 10' | 0.1 | 13 | 10.8 | 19 | 0.92 |
| | | 20' | 0.1 | 13 | 7.0 | 10 | 0.88 |
| | | 1' | 0.1 | 21 | 10.4 | 20 | 0.95 |
| | | 10' | 0.1 | 21 | 11.0 | 30 | 0.92 |
| | | 30' | 0.1 | 21 | 8.8 | 20 | 0.97 |
| | | 10' | 0.1 | 52 | 6.7 | 7 | 0.990 |
| | | | Average: 8.9 ± 1.8 | | | | |
| Paratoluene 0.1M Sulfonic acid 0.2M | $NO_2BDT$ | — | 0.05 | 21 | 6.6 | 30 | 0.87 |
| | | 10' | 0.1 | 21 | 7 | 25 | 0.8 |
| Methoxyacetic acid 0.5M | $NO_2BDT$ | 10' | 0.1 | 21 | 7.9 | 30 | 0.97 |
| Dimethylsulfoxide 0.35M + HCl 0.12M | $NO_2BDT$ | 30' | 0.1 | 21 | 12.8 | 60 | 0.96 |
| Propylphosphonic acid 40 mM | $NO_2BDT$ | 15' | 0.1 | 24 | 7.4 | 30 | 0.98 |

4. Preparation and Separation of Metal and Semi-Conducting SWNTs

A solution of 1 mM nitrobenzenediazonium tetrafluoroborate and of 0.5 M trifluoroacetic acid and of 2% F127 in pure water is prepared and incubated at room temperature for 10 min. 1.9 mL of this mixture is added to 17 mL of aqueous solution of SWNTs at 24 mg/L and 2% F127 and the whole is maintained under magnetic stirring for one hour at room temperature. 2 mL of an aqueous solution with 50 mM naphthol and 2% F127 are added and after 10 min of incubation, the mixture is precipitated by adding 40 mL of ethanol, is filtered under vacuum (a tetrafluoroethylene filter with a porosity of 0.45 μm). The residue is rinsed with ethanol and with pure water.

Half of the residue is dissolved in 10 mL of concentrated hydrochloric acid solution (35%) by treatment in an ultrasonic bath for 10 min (80 W, 45 kHz). The mixture is brought to boiling, 20 mg of tin dichloride (II) are added and reflux is maintained for 2 h. The mixture is cooled on an ice bath and hydrolyzed by adding a solution of 4 g of sodium hydroxide in 10 mL of water. 20 mL of ethanol are added in order to precipitate the SWNTs and the whole is filtered under vacuum on a polytetrafluoroethylene filter with a porosity of 0.2 μm and then rinsed with ethanol and water.

Figures 7A, 7B, 7C:
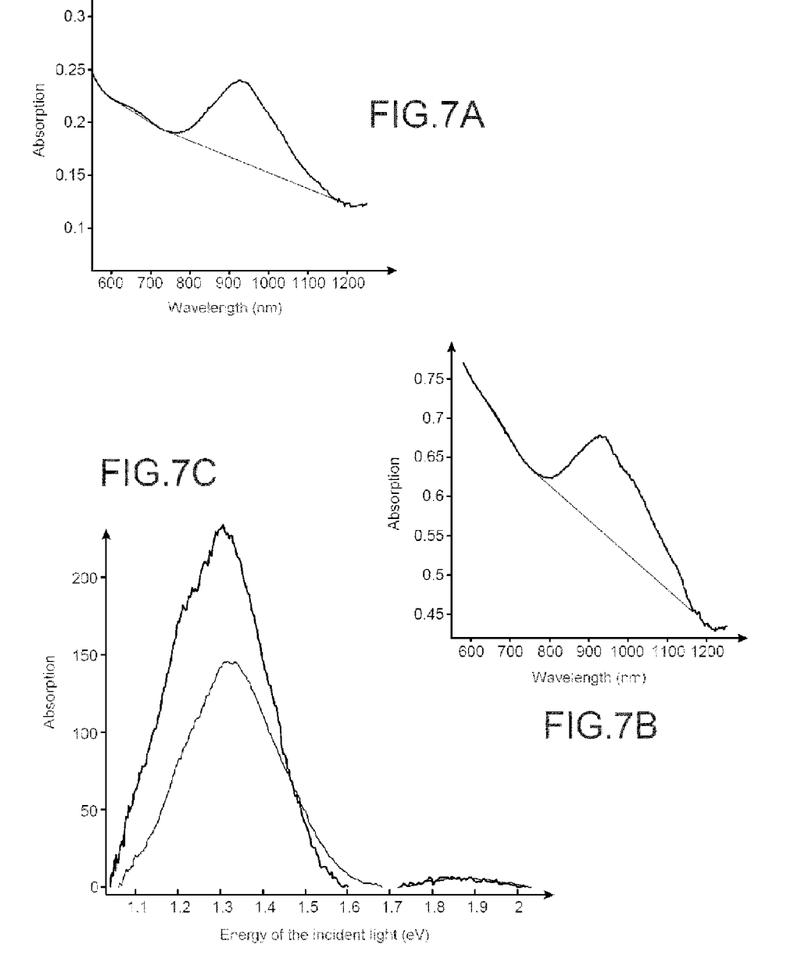
FIGS. 7A and 7B are absorption spectra (absorption vs. the wavelength in nm) of the fractions of SWNT after enrichment in sc-SWNT: supernatant (FIG. 7A) and sediment (FIG. 7B). The baselines for the peaks of m-SWNTs (600-700 nm) and of sc-SWNTs (750-1200 nm) are illustrated as broken lines.
FIG. 7C shows the absorption peaks of the SWNTs depending on the energy of the incident light (eV) for the supernatant fractions (broken line) and the sediment (solid line). The baseline obtained from the spectra of FIGS. 7A and 7B is subtracted from the spectra of the peaks and the obtained curve is illustrated thus as the energy of the incident light. The area under the curve is calculated for each peak and the curves are re-normalized by the area of the m-SWNT peak (1.7-2.05 eV). The ratios of the sc-SWNT/m-SWNT peaks are of 40 and 64 for the supernatant and for the sediment, respectively.

The residue is dissolved in 10 mL of a 2% F127 aqueous solution in the ultrasonic bath. The suspension is then centrifuged for 20 min at 1,000 g. The supernatant is separated and the sediment is rinsed twice with a 2% F127 aqueous solution. The rinsed sediment is dissolved in 10 mL of this solution and the absorption spectra of the supernatant and of the sediment are measured and compared (FIG. 7).

As shown from the peaks and subsequent to the subtraction of the background spectrum, the supernatant is enriched in m-SWNT and the sediment in sc-SWNT. Indeed, the sc-SWNT peak/m-SWNT peak ratio is 40 in the supernatant and 64 in the sediment.

By means of the selective reactivity of the diazonium salt derivatives with the m-SWNTs rather than with the sc-SWNTs, a fraction enriched in sc-SWNTs may be isolated.

REFERENCES

[1] Marquardt C W, Dehm S, Vijayaraghavan A, Blatt S, Hennrich F, Krupke R: « Reversible metal-insulator transitions in metallic single-walled carbon nanotubes » Nano Lett. 2008, 8:2767-2772.
[2] Arnold M S, Green A A, Hulvat J F, Stupp S I, Hersam M C: « Sorting carbon nanotubes by electronic structure using density differentiation» Nature Nanotechnology 2006, 1:60-65.
[3] International application WO 2003/084869 (W.M. Rice University) « Method for separating single-wall carbon nanotubes and compositions thereof» published on Oct. 16, 2003.
[4] Patent application US 2006/0223068 « Sorting of carbon nanotubes through selective DNA delamination of DNA/carbon nanotube hybrid structures» published on Oct. 5, 2006.
[5] International application WO 2004/048256 (Du Pont de Nemours Co) « Separation of carbon nanotubes dispersed by nucleic acids» published on Jun. 10, 2004.
[6] International application WO 2006/013788 (University of Tsukuba) « Method of carbon nanotube separation, dispersion liquid and carbon nanotube obtained by the separation method» published on Feb. 9, 2006.
[7] International application WO 2005/030640 (Intel Corporation) « Carbon nanotube structure-selective separation and surface fixation» published on Apr. 7, 2005.
[8] International application WO 2005/041227 (Intel Corporation) « Method of sorting carbon nanotubes» published on May 6, 2005.
[9] Patent application US 2005/0255031 « Method for selectively separating semiconductive carbon nanotubes» published on Nov. 17, 2005.
[10] International application US 2007/0258880 (Japan Science and Technology Agency) « Carbon nanotube structure-selective separation and surface fixation» published on Nov. 8, 2007.
[11] Menard-Moyon C, Izard N, Doris E, Mioskowski C, « Separation of semiconducting from metallic carbon nanotubes by selective functionalization with azomethine ylides» , Journal of the American Chemical Society 2006, 128:6552-6553.
[12] Patent application JP 2007 031238 (Sony Corporation) « Method for separation of metallic carbon nanotubes, method for producing thin film of semiconducting carbon nanotube, thin-film transistor and its production method, electronic element, and method of producing the element » published on Feb. 8, 2007.
[13] International application WO 2004/043857 « Manipulation of derivatized carbon nanotubes» published on May 27, 2004.
[14] Lyskawa J, Belanger D: « Direct modification of a gold electrode with aminophenyl groups by electrochemical reduction of in situ generated aminophenyl monodiazonium cations» Chem. Mater. 2006, 18: 4755-4763.
[15] Gomberg W E, Bachmann J: « The synthesis of biaryl compounds by means of the diazo reaction» Am. Chem. Soc. 1924, 46: 2339-2343.
[16] International application WO 03/006725 (Universities Space Research Associat.) « Manipulation of derivatized carbon nanotubes» published on Jan. 23, 2003.

What is claimed is:

1. A method for separating metal carbon nanotubes with a single graphene layer (m-SWNT) and semiconductor nanotubes with a single graphene layer (sc-SWNT) comprising:
grafting a diazonium salt derivative on a mixture of m-SWNTs and of sc-SWNTs so as to obtain a mixture of grafted m-SWNTs and of non-grafted sc-SWNTs, whereby the grafted m-SWNTs and the non-grafted sc-SWNTs separate because of differential chemical and/or physical properties caused by said grafting wherein said diazonium salt derivative is a diazoester having a formula comprising a —N$_2$—O—C(O)— structural element.

2. The method according to claim 1, wherein said grafting is radical chemical grafting.

3. The method according to claim 1, wherein said nanotubes have a length comprised between 10 nm and 400 µm and a diameter comprised between 0.2 and 6 nm.

4. The method according to claim 1, wherein said diazonium salt is an aryl diazonium salt.

5. The method according to claim 4, wherein said aryl diazonium salt is of formula (I):

$$R_6\text{---}N_2^+, A^- \tag{I}$$

wherein:
A represents a monovalent anion and
$R_6$ represents an aryl group.

6. The method according to claim 5, wherein said aryl group is a mono- or poly-cyclic, aromatic or heteroaromatic group, optionally substituted, having from 6 to 20 carbon atoms.

7. The method according to claim 5, wherein A is selected from the group consisting of halides, halogenoborates, perchlorates, sulfonates, alcoholates and carboxylates.

8. The method according to claim 2, wherein said reaction by radical chemical grafting consists of subjecting, in the presence of said carbon nanotubes, the diazonium salt derivative to non-electrochemical conditions allowing the formation of at least one radical entity from said derivative.

9. The method according to claim 8, wherein said non-electrochemical conditions are selected from the group consisting of thermal, kinetic, chemical, photochemical, radiochemical conditions and their combinations.

10. The method according to claim 1, wherein it comprises the successive steps of:
a) putting a solution $S_3$ comprising a mixture of m-SWNTs and sc-SWNTs in contact with at least one diazonium salt derivative;
b) grafting, by radical chemical lasting said diazonium salt derivative on said mixture of m-SWNTs and sc-SWNTs according to the grafting step as defined in claim 8 or 9, so as to obtain a mixture of grafted m-SWNTs and of non-grafted sc-SWNTs; and
c) optionally purifying the grafted m-SWNTs and/or the non-grafted sc-SWNTs on the basis of differential chemical and/or physical properties caused by said grafting.

11. The method according to claim 10, wherein, prior to said step (a), the SWNTs undergo a treatment comprising the successive steps of:
i') putting a suspension of a mixture of m-SWNTs and sc-SWNTs in contact with a solution containing nitric acid;
ii') heating the solution obtained in step (i') and then cooling it;
iii') filtering the solution obtained in step (ii') and suspending the filtrate in a solution with a basic pH;

iv') filtering the suspension obtained in step (iii') and suspending the filtrate in a solution containing a dispersant; and v') subjecting the solution obtained in step (iv') to size exclusion chromatography.

12. The method according to claim 10, wherein said solution $S_3$ contains as a solvent, a protic solvent.

13. The method according to claim 10, wherein said solution $S_3$ further comprises a dispersant.

14. The method according to claim 10, wherein said step (c) applies at least one technique selected from separation techniques based on chemical affinity, on filtration, on centrifugation, on electrophoresis and/or on chromatography.

15. A kit for separating m-SWNTs and sc-SWNTs contained in a mixture comprising:

α) in a first compartment, a solution containing at least one diazonium salt derivative as defined in claim 1, β) in a second compartment, a solution containing at least one agent which may stop the reaction, by radical chemical grafting, of the diazonium salt derivative on the m-SWNTs and sc-SWNTs.

16. A kit for separating m-SWNTs and sc-SWNTs contained in a mixture comprising:

α') in a first compartment, a solution containing at least one diazonium salt as defined in claim 4, or one of its precursors;

β') in a second compartment, a compound C selected from the group consisting of an organic acid, a sulfoxide, an alcohol and one of their salts;

γ') in a third compartment, a solution containing at least one agent which may stop the reaction, by radical chemical grafting, of the diazonium salt derivative on the m-SWNTs and sc-SWNTs.

17. The method according to claim 5, wherein said aryl group is a mono- or poly-cyclic, aromatic or heteroaromatic group, optionally substituted, having from 6 to 14 carbon atoms.

18. The method according to claim 5, wherein said aryl group is a mono- or poly-cyclic, aromatic or heteroaromatic group, optionally substituted, having from 6 to 8 carbon atoms.

* * * * *